US010251142B2

(12) United States Patent
Zhou et al.

(10) Patent No.: US 10,251,142 B2
(45) Date of Patent: Apr. 2, 2019

(54) USER EQUIPMENT AND METHOD FOR TIME AND FREQUENCY SYNCHRONIZATION (71) Applicant: SPREADTRUM COMMUNICATIONS (SHANGHAI) CO., LTD., Zhangjiang, Shanghai (CN)

(72) Inventors: Huayu Zhou, Shanghai (CN); Yanan Jia, Shanghai (CN); Hualei Wang, Shanghai (CN); Weijie Xu, Shanghai (CN); Zhengang Pan, Shanghai (CN)

(73) Assignee: SPREADTRUM COMMUNICATIONS (SHANGHAI) CO. LTD., Shanghai (CN)

( * ) Notice: Subject to any disclaimer, the term of this patent is extended or adjusted under 35 U.S.C. 154(b) by 7 days.

(21) Appl. No.: 15/453,260

(22) Filed: Mar. 8, 2017

(65) Prior Publication Data
US 2017/0347328 A1 Nov. 30, 2017

(30) Foreign Application Priority Data

May 31, 2016 (CN) .......................... 2016 1 0377358

(51) Int. Cl.
*H04W 56/00* (2009.01)
*H04L 5/00* (2006.01)
(Continued)

(52) U.S. Cl.
CPC ....... *H04W 56/001* (2013.01); *H04J 11/0073* (2013.01); *H04L 5/0005* (2013.01);
(Continued)

(58) Field of Classification Search
None
See application file for complete search history.

(56) References Cited

U.S. PATENT DOCUMENTS

2013/0121246 A1   5/2013 Guey et al.
2013/0195070 A1*  8/2013 Bashar .................... H04W 4/70
                                                          370/330
(Continued)

FOREIGN PATENT DOCUMENTS

CN   102291731 A   12/2011
CN   102883341 A   1/2013
(Continued)

OTHER PUBLICATIONS

SIPO First Office Action for corresponding CN Application No. 2016103773585; dated Apr. 28, 2018.

*Primary Examiner* — Faruk Hamza
*Assistant Examiner* — Cassandra L Decker
(74) *Attorney, Agent, or Firm* — Cantor Colburn LLP (57) ABSTRACT User Equipment and method for time and frequency synchronization, the method includes: a UE measuring a primary measurement reference signal transmitted on at least one basic sub-band, where the at least one basic sub-band has a preset carrier numerology and a preset waveform configuration; calculating a first time deviation and a first frequency deviation between the UE and a base station on the at least one basic sub-band, based on a measurement result obtained by measuring the primary measurement reference signal; and keeping the UE in time and frequency synchronization with the base station on the at least one basic sub-band, based on the first time deviation and the first frequency deviation. Accordingly, time and frequency synchronization between UE and base station in a 5G system can be achieved.

32 Claims, 3 Drawing Sheets (51) Int. Cl.
  *H04W 72/08*   (2009.01)
  *H04J 11/00*   (2006.01)
  *H04W 72/12*   (2009.01)

(52) U.S. Cl.
  CPC ......... *H04L 5/0051* (2013.01); *H04W 72/085* (2013.01); *H04W 72/1231* (2013.01)

(56) References Cited

U.S. PATENT DOCUMENTS

| | | | |
|---|---|---|---|
| 2015/0063140 A1* | 3/2015 | Yi | H04L 5/005 370/252 |
| 2016/0073370 A1* | 3/2016 | Axmon | H04W 56/0015 370/350 |
| 2016/0157194 A1 | 6/2016 | Svedman et al. | |

FOREIGN PATENT DOCUMENTS

| | | |
|---|---|---|
| CN | 104081840 A | 10/2014 |
| WO | 2015013208 A1 | 1/2015 |

* cited by examiner

USER EQUIPMENT AND METHOD FOR TIME AND FREQUENCY SYNCHRONIZATION

CROSS-REFERENCE TO RELATED APPLICATIONS

This application claims the benefit of priority to Chinese Patent Application No. 201610377358.5, filed on May 31, 2016, and entitled "USER EQUIPMENT AND METHOD FOR TIME AND FREQUENCY SYNCHRONIZATION", and the entire disclosure of which is incorporated herein by reference.

TECHNICAL FIELD

The present disclosure generally relates to wireless communication technology, and more particularly, to a user equipment and a method for time and frequency synchronization.

BACKGROUND

LTE (Long Term Evolution) is a long-term evolution of the UMTS (Universal Mobile Telecommunications System) technology standard developed by the 3GPP (3rd Generation Partnership Project).

In the LTE system, a base station needs to transmit a cell-specific reference signal periodically, and a UE (User Equipment) synchronizes with the base station in time and frequency by tracking the reference signal. In general, the cell-specific reference signal is also referred to as a common reference signal. In some cases, the UE may perform channel estimation by means of a UE-specific reference signal, to receive data.

In a 5G (5th Generation) system, in order to satisfy requirements of different application scenarios and deployment scenarios, different sub-bands may have different carrier numerologies, such as subcarrier spacing, CP (Cyclic Prefix) length and the like. Further, different sub-bands may have different waveform configurations, for example, the waveform may be multi-carrier, single carrier, etc., to meet requirements of different service data transmissions. Since the carrier numerologies of different sub-bands are not the same, existing common reference signals can not realize time and frequency synchronization between the UE and the base station.

SUMMARY

Technical problems solved by the present disclosure include: how to realize time and frequency synchronization between a UE (User Equipment) and a base station in a 5G (5th Generation) system.

In order to solve above recited problem, the present disclosure provides a method for time and frequency synchronization, including: a UE (User Equipment) measuring a primary measurement reference signal transmitted on at least one basic sub-band, where the at least one basic sub-band has a preset carrier numerology and a preset waveform configuration; calculating a first time deviation and a first frequency deviation between the UE and a base station on the at least one basic sub-band, based on a measurement result obtained by measuring the primary measurement reference signal; and keeping the UE in time and frequency synchronization with the base station on the at least one basic sub-band, based on the first time deviation and the first frequency deviation.

In some embodiments, the primary measurement reference signal transmitted on the at least one basic sub-band is configured and transmitted by the base station.

In some embodiments, when the UE is scheduled to receive data on other sub-bands, the method for time and frequency synchronization further includes: measuring a UE-specific reference signal transmitted on the other sub-bands; calculating a second time deviation and a second frequency deviation between the UE and the base station on the other sub-bands, based on a measurement result obtained by measuring the UE-specific reference signal; calibrating the first time deviation based on the second time deviation to obtain a first time deviation calibration result, and calibrating the first frequency deviation based on the second frequency deviation to obtain a first frequency deviation calibration result; and keeping the UE in time and frequency synchronization with the base station on the other sub-bands, based on the first time deviation calibration result and the first frequency deviation calibration result.

In some embodiments, the UE-specific reference signal transmitted on the other sub-bands is configured and transmitted by the base station.

In some embodiments, when the UE is scheduled to receive data on other sub-bands, the method for time and frequency synchronization further includes: when the other sub-bands are determined to be configured with a secondary measurement reference signal and the secondary measurement reference signal is determined to be associated with the primary measurement reference signal, measuring the secondary measurement reference signal transmitted on the other sub-bands; calculating a third time deviation and a third frequency deviation between the UE and the base station on the other sub-bands, based on the measurement result obtained by measuring the primary measurement reference signal and a measurement result obtained by measuring the secondary measurement reference signal; and keeping the UE in time and frequency synchronization with the base station on the other sub-bands, based on the third time deviation and the third frequency deviation.

In some embodiments, the secondary measurement reference signal transmitted on the other sub-bands is configured and transmitted by the base station.

In some embodiments, the secondary measurement reference signal is determined to be associated with the primary measurement reference signal includes: when reference signal association information transmitted by the base station is a preset first value, the secondary measurement reference signal is determined to be associated with the primary measurement reference signal.

In some embodiments, when the UE is scheduled to receive data on other sub-bands, the method for time and frequency synchronization further includes: measuring a UE-specific reference signal transmitted on the other sub-bands; calculating a fourth time deviation and a fourth frequency deviation between the UE and the base station on the other sub-bands, based on a measurement result obtained by measuring the UE-specific reference signal; calibrating the third time deviation based on the fourth time deviation to obtain a second time deviation calibration result, and calibrating the third frequency deviation based on the fourth frequency deviation to obtain a second frequency deviation calibration result; and keeping the UE in time and frequency synchronization with the base station on the other sub-bands, based on the second time deviation calibration result and the second frequency deviation calibration result.

In some embodiments, the UE-specific reference signal transmitted on the other sub-bands is configured and transmitted by the base station.

In some embodiments, when the UE is scheduled to receive data on other sub-bands, the method for time and frequency synchronization further includes: when the other sub-bands are determined to be configured with a secondary measurement reference signal and the secondary measurement reference signal is determined to be not associated with the primary measurement reference signal, measuring the secondary measurement reference signal transmitted on the other sub-bands; calculating a fifth time deviation and a fifth frequency deviation between the UE and the base station on the other sub-bands, based on a measurement result obtained by measuring the secondary measurement reference signal; and keeping the UE in time and frequency synchronization with the base station on the other sub-bands, based on the fifth time deviation and the fifth frequency deviation.

In some embodiments, the secondary measurement reference signal transmitted on the other sub-bands is configured and transmitted by the base station.

In some embodiments, the secondary measurement reference signal is determined to be not associated with the primary measurement reference signal includes: when reference signal association information transmitted by the base station is a preset second value, the secondary measurement reference signal is determined to be not associated with the primary measurement reference signal.

In some embodiments, when the UE is scheduled to receive data on other sub-bands, the method for time and frequency synchronization further includes: measuring a UE-specific reference signal transmitted on the other sub-bands; calculating a sixth time deviation and a sixth frequency deviation between the UE and the base station on the other sub-bands, based on a measurement result obtained by measuring the UE-specific reference signal; calibrating the fifth time deviation based on the sixth time deviation to obtain a third time deviation calibration result, and calibrating the fifth frequency deviation based on the sixth frequency deviation to obtain a third frequency deviation calibration result; and keeping the UE in time and frequency synchronization with the base station on the other sub-bands, based on the third time deviation calibration result and the third frequency deviation calibration result.

In some embodiments, the UE-specific reference signal transmitted on the other sub-bands is configured and transmitted by the base station.

In some embodiments, the primary measurement reference signal is transmitted according to a first cycle, and the secondary measurement reference signal is transmitted according to a second cycle.

In some embodiments, the primary measurement reference signal is transmitted according to a first cycle, and the secondary measurement reference signal is not transmitted periodically.

In some embodiments, the UE-specific reference signal is further used for the UE demodulating data received on the other sub-bands.

Embodiments of the present disclosure further provides a user equipment, including: a measuring circuitry configured to: measure a primary measurement reference signal transmitted on at least one basic sub-band, wherein the at least one basic sub-band has a preset carrier numerology and a preset waveform configuration; a calculating circuitry configured to: calculate a first time deviation and a first frequency deviation between the UE and a base station on the at least one basic sub-band, based on a measurement result obtained by measuring the primary measurement reference signal; and a synchronizing circuitry configured to: keep the UE in time and frequency synchronization with the base station on the at least one basic sub-band, based on the first time deviation and the first frequency deviation.

In some embodiments, the primary measurement reference signal transmitted on the at least one basic sub-band is configured and transmitted by the base station.

In some embodiments, the measuring circuitry is further configured to: when the UE is scheduled to receive data on other sub-bands, measure a UE-specific reference signal transmitted on the other sub-bands; the calculating circuitry is further configured to: calculate a second time deviation and a second frequency deviation between the UE and the base station on the other sub-bands, based on a measurement result obtained by measuring the UE-specific reference signal, calibrate the first time deviation based on the second time deviation to obtain a first time deviation calibration result, and calibrate the first frequency deviation based on the second frequency deviation to obtain a first frequency deviation calibration result; and the synchronizing circuitry is further configured to: keep the UE in time and frequency synchronization with the base station on the other sub-bands, based on the first time deviation calibration result and the first frequency deviation calibration result.

In some embodiments, the UE-specific reference signal transmitted on the other sub-bands is configured and transmitted by the base station.

In some embodiments, the measuring circuitry is further configured to: when the UE is scheduled to receive data on other sub-bands, the other sub-bands are determined to be configured with a secondary measurement reference signal, and the secondary measurement reference signal is determined to be associated with the primary measurement reference signal, measure the secondary measurement reference signal transmitted on the other sub-bands; the calculating circuitry is further configured to: calculate a third time deviation and a third frequency deviation between the UE and the base station on the other sub-bands, based on the measurement result obtained by measuring the primary measurement reference signal and a measurement result obtained by measuring the secondary measurement reference signal; and the synchronizing circuitry is further configured to: keep the UE in time and frequency synchronization with the base station on the other sub-bands, based on the third time deviation and the third frequency deviation.

In some embodiments, the secondary measurement reference signal transmitted on the other sub-bands is configured and transmitted by the base station.

In some embodiments, the measuring circuitry is further configured to: when reference signal association information transmitted by the base station is a preset first value, determine the secondary measurement reference signal to be associated with the primary measurement reference signal.

In some embodiments, the measuring circuitry is further configured to: when the UE is scheduled to receive data on other sub-bands, measure a UE-specific reference signal transmitted on the other sub-bands; the calculating circuitry is further configured to: calculate a fourth time deviation and a fourth frequency deviation between the UE and the base station on the other sub-bands, based on a measurement result obtained by measuring the UE-specific reference signal, calibrate the third time deviation based on the fourth time deviation to obtain a second time deviation calibration result, and calibrate the third frequency deviation based on the fourth frequency deviation to obtain a second frequency deviation calibration result; and the synchronizing circuitry is further configured to: keep the UE in time and frequency synchronization with the base station on the other sub-bands, based on the second time deviation calibration result and the second frequency deviation calibration result.

In some embodiments, the UE-specific reference signal transmitted on the other sub-bands is configured and transmitted by the base station.

In some embodiments, the measuring circuitry is further configured to: when the UE is scheduled to receive data on other sub-bands, the other sub-bands are determined to be configured with a secondary measurement reference signal, and the secondary measurement reference signal is determined to be not associated with the primary measurement reference signal, measure the secondary measurement reference signal transmitted on the other sub-bands; the calculating circuitry is further configured to: calculate a fifth time deviation and a fifth frequency deviation between the UE and the base station on the other sub-bands, based on a measurement result obtained by measuring the secondary measurement reference signal; and the synchronizing circuitry is further configured to: keep the UE in time and frequency synchronization with the base station on the other sub-bands, based on the fifth time deviation and the fifth frequency deviation.

In some embodiments, the secondary measurement reference signal transmitted on the other sub-bands is configured and transmitted by the base station.

In some embodiments, the measuring circuitry is further configured to: when reference signal association information transmitted by the base station is a preset second value, determine the secondary measurement reference signal to be not associated with the primary measurement reference signal.

In some embodiments, the measuring circuitry is further configured to: when the UE is scheduled to receive data on other sub-bands, measure a UE-specific reference signal transmitted on the other sub-bands; the calculating circuitry is further configured to: calculate a sixth time deviation and a sixth frequency deviation between the UE and the base station on the other sub-bands, based on a measurement result obtained by measuring the UE-specific reference signal, calibrate the fifth time deviation based on the sixth time deviation to obtain a third time deviation calibration result, and calibrate the fifth frequency deviation based on the sixth frequency deviation to obtain a third frequency deviation calibration result; and the synchronizing circuitry is further configured to: keep the UE in time and frequency synchronization with the base station on the other sub-bands, based on the third time deviation calibration result and the third frequency deviation calibration result.

In some embodiments, the UE-specific reference signal transmitted on the other sub-bands is configured and transmitted by the base station.

In some embodiments, the primary measurement reference signal is transmitted according to a first cycle, and the secondary measurement reference signal is transmitted according to a second cycle.

In some embodiments, the primary measurement reference signal is transmitted according to a first cycle, and the secondary measurement reference signal is not transmitted periodically.

In some embodiments, the UE-specific reference signal is further used for the UE demodulating data received on the other sub-bands.

In comparison with exiting technologies, the technical solution according to embodiment of the present disclosure possess following advantages:

In the present disclosure, the UE can calibrate its own time and frequency based on a primary measurement reference signal transmitted on at least one basic sub-band according to practical requirements, so as to synchronize with a base station in time and frequency on the at least one basic sub-band. Accordingly, time and frequency synchronization between the UE and the base station is achieved.

Further, when the UE is in time and frequency synchronization with the base station, the UE is scheduled to receive data on other sub-bands, the other sub-bands are determined, via a signaling transmitted on the basic sub-band, to be configured with a secondary measurement reference signal, and the secondary measurement reference signal is determined to be associated with the primary measurement reference signal, in this case, the UE can synchronize with the base station in time and frequency on the other sub-bands based on the primary measurement reference signal and the secondary measurement reference signal. Accordingly, requirements of different service data transmission can be met, and meanwhile time and frequency synchronization between the UE and the base station can be achieved.

Further, when the UE is in time and frequency synchronization with the base station, the UE is scheduled to receive data on other sub-bands, the other sub-bands are determined, via a signaling transmitted on the basic sub-band, to be configured with a secondary measurement reference signal, and the secondary measurement reference signal is determined to be not associated with the primary measurement reference signal, in this case, the UE can synchronize with the base station in time and frequency on the other sub-bands only based on the secondary measurement reference signal. Accordingly, requirements of different service data transmission can be met, and meanwhile time and frequency synchronization between the UE and the base station can be achieved.

Further, the secondary measurement reference signal transmitted on the sub-band can be transmitted in a preset period of time according to a second cycle to meet data receiving requirements of the UE. Accordingly, system overhead and resources can be saved, and flexibility of time and frequency synchronization between the UE and the base station is enhanced.

DETAILED DESCRIPTION

As recited in the background, in a 5G (5th Generation) system, different sub-bands may have different carrier numerologies, such as subcarrier spacing, CP (Cyclic Prefix) length and the like, so as to satisfy requirements of different application scenarios and deployment scenarios. Further, different sub-bands may have different waveform configurations, for example, the waveform may be multi-carrier, single carrier, etc., to meet requirements of different service data transmissions. Since the carrier numerologies of different sub-bands are not the same, existing common reference signals can not realize time and frequency synchronization between a UE (User equipment) and a base station.

In order to solve above recited problem, embodiments of the present disclosure provides a UE (User equipment). The UE can calibrate its own time and frequency based on a primary measurement reference signal transmitted on at least one basic sub-band according to practical needs, so as to keep time and frequency synchronization with a base station on the basic sub-band. By such a way, time and frequency synchronization between the UE and a base station can be achieved.

In order to make above recited objectives, features and advantages of the present disclosure clear and easy to understand, embodiments of the present disclosure will be illustrated in detailed as follow in combination with corresponding drawings.

Figure 1:
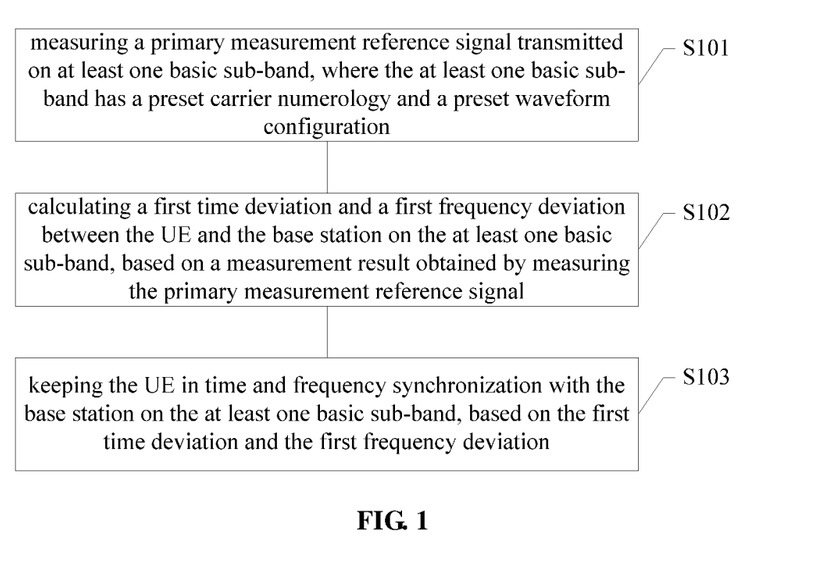
FIG. 1 schematically illustrates a flow chart of a method for time and frequency synchronization according to one embodiment of the present disclosure.

FIG. 1 schematically illustrates a flow chart of a method for time and frequency synchronization of the present disclosure. Referring to FIG. 1, in some embodiments, the method for time and frequency synchronization of the present disclosure may include following steps from S101 to S103.

In step S101: measuring a primary measurement reference signal transmitted on at least one basic sub-band, where the at least one basic sub-band has a preset carrier numerology and a preset waveform configuration.

In some embodiments, a base station may configure and transmit the primary measurement reference signal transmitted on the basic sub-band according to practical needs; and the UE may track the primary measurement reference signal transmitted on the at least one basic sub-band by measuring the primary measurement reference signal transmitted on the at least one basic sub-band.

In some embodiments, a frequency band may be divided into a plurality of sub-bands in frequency, and different sub-bands may have different carrier numerologies and different waveform configurations. Therefore, the base station may set different basic sub-bands for different frequency bands, and the UE may select the primary measurement reference signal transmitted on a corresponding basic sub-band to implement the measuring process. Or, the base station may set a same basic sub-band for different frequency bands. Wherein, the primary measurement reference signal transmitted on the basic sub-band and configured by the base station may be transmitted periodically, for example, be transmitted according to a preset first cycle.

In step S102: calculating a first time deviation and a first frequency deviation between the UE and the base station on the at least one basic sub-band, based on a measurement result obtained by measuring the primary measurement reference signal.

In some embodiments, the measurement result obtained by measuring the primary measurement reference signal includes a time and a frequency of the primary measurement reference signal. The UE may take values of a time deviation and a frequency deviation obtained by measuring the primary measurement reference signal as the first time deviation and the first frequency deviation, respectively.

In step S103: keeping the UE in time and frequency synchronization with the base station on the at least one basic sub-band, based on the first time deviation and the first frequency deviation.

In some embodiments, the UE may calibrate a time and a frequency of its own receiver when the first time frequency deviation and the first frequency deviation are obtained by calculating, so as to keep the UE in time and frequency synchronization with the base station on the at least one basic sub-band.

Accordingly, the UE may, based on practical needs, calibrate its own time and frequency based on the primary measurement reference signal transmitted on the at least one basic sub-band, to synchronize with the base station in time and frequency on the basic sub-band. By such a way, time and frequency synchronization between the UE and the base station is achieved.

Hereafter, the method for time and frequency synchronization of the present disclosure will be described in detail as following.

Figure 2:
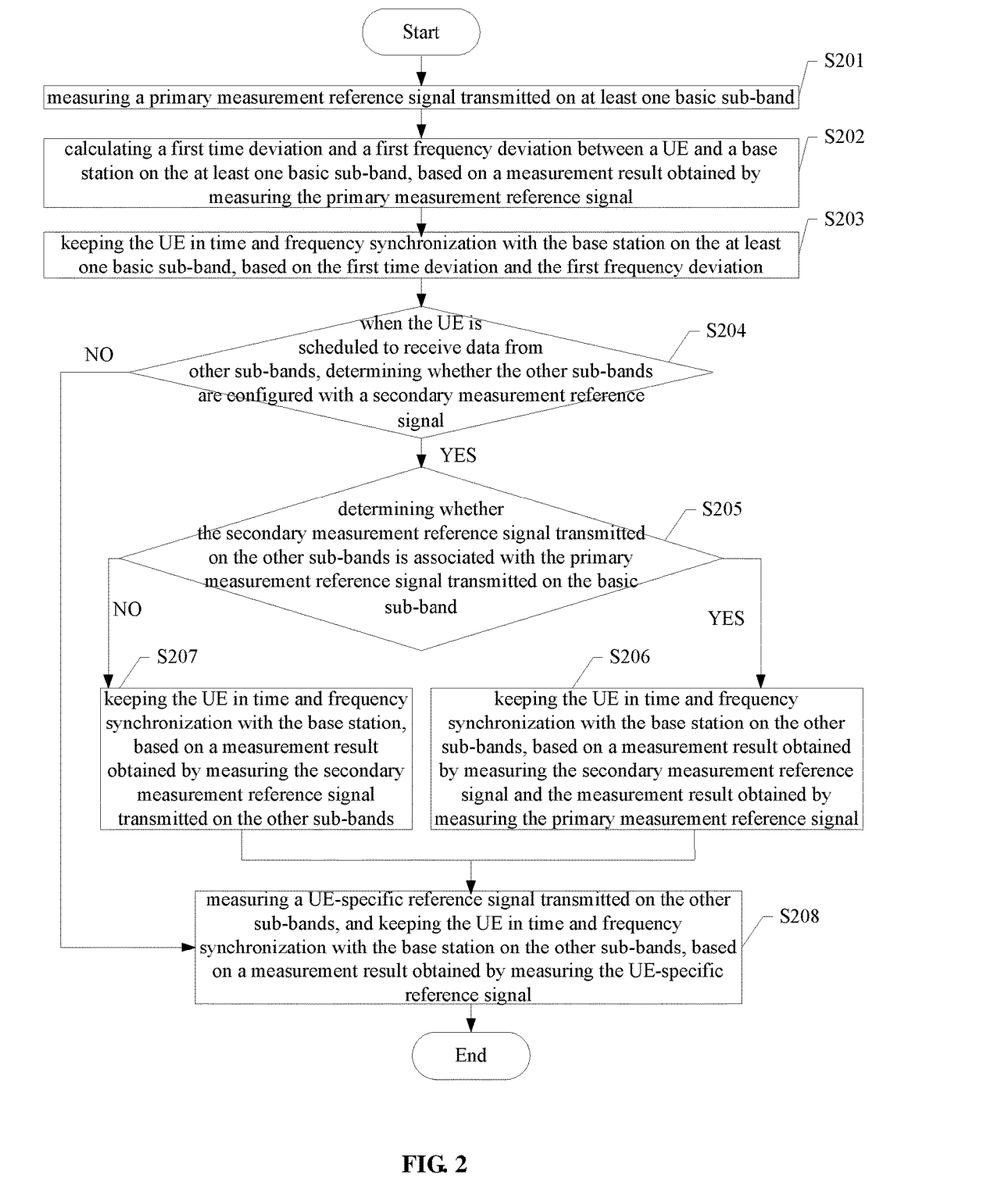
FIG. 2 schematically illustrates a flow chart of a method for time and frequency synchronization according to another embodiment of the present disclosure.

Referring to FIG. 2, in one embodiment, the method for time and frequency synchronization of the present disclosure may include following steps from S201 to S208.

In step S201: measuring a primary measurement reference signal transmitted on at least one basic sub-band.

In some embodiments, the at least one basic sub-band includes one basic sub-band, and the basic sub-band has a preset carrier numerology and a preset waveform configuration.

In step S202: calculating a first time deviation and a first frequency deviation between a UE (User Equipment) and a base station on the at least one basic sub-band, based on a measurement result obtained by measuring the primary measurement reference signal.

In step S203: keeping the UE in time and frequency synchronization with the base station on the at least one basic sub-band, based on the first time deviation and the first frequency deviation.

In step S204: when the UE is scheduled to receive data from other sub-bands, determining whether the other sub-bands are configured with a secondary measurement reference signal; and if yes, implementing step S205, otherwise, implementing step S208.

In some embodiments, for different service data transmission requirements, a carrier numerology and a waveform configuration of the other sub-bands in the frequency band may be the same as that of the basic sub-band, or may be different from that of the basic sub-band.

Wherein, when the other sub-bands has a same carrier numerology and a same waveform configuration with the basic sub-band, the UE synchronizes with the base station in time and frequency both on the basic sub-band and the other sub-bands, based on the primary measurement reference signal. Therefore, the base station may not need to configure a secondary measurement reference signal on the other sub-bands, and the UE may be in time and frequency synchronization with the base station on the other sub-bands without the secondary measurement reference signal transmitted on the other sub-bands, or the other sub-bands be configured with the secondary measurement reference signal to improve an accuracy of the time and frequency synchronization.

When the other sub-bands have a different carrier numerology and a different waveform configuration from the basic sub-band, the base station may configure a secondary measurement reference signal for the other sub-bands according to service data transmission requirements, or may not configure a secondary measurement reference signal for the other sub-bands. For example, when data transmitted from the base station to the UE via the other sub-bands has requirements of low delay and high reliability, in order to meet these requirements, the base station configures a corresponding secondary measurement reference signal on the other sub-band. On the other hand, when data transmitted from the base station to the UE via the other sub-bands has low requirements to data delay and reliability, the other sub-bands may be not configured with a corresponding secondary measurement reference signal, so as to save system overhead and save resources.

In some embodiments, when the user equipment is scheduled to receive data from other sub-bands, since the UE has already be kept in time and frequency synchronization with the base station on the basic sub-band based on the primary measurement reference signal, the base station can transmit a corresponding signaling to the UE via the basic sub-band, and the UE can receive and demodulate the signaling transmitted by the base station via the basic sub-band. Therefore, when the UE is scheduled to receive data from other sub-bands, the base station can inform, via the signaling transmitted on the basic sub-band, the UE whether or not the other sub-bands are configured with the secondary measurement reference signal. Wherein, the other sub-bands may transmit the signaling in a different manner. For example, when the basic sub-band is configured with the secondary measurement reference signal, the base station carries a first parameter value in a corresponding signaling; otherwise, the base station carries a second parameter value in a corresponding signaling, wherein meanings of the first parameter value and the second parameter value may be informed to the UE by the base station via a signaling, or may be predetermined by a protocol.

In some embodiments, when the other sub-bands are configured with the secondary measurement reference signal, the secondary measurement reference signal transmitted on the other sub-bands may be transmitted periodically, and the base station may set different transmitting cycles for the secondary measurement signals on different sub-bands according to practical needs. Wherein, the base station may configure a transmission cycle of the secondary measurement reference signal on the other sub-bands to be associated with a transmission cycle of the primary measurement reference signal. For example, the transmission cycle of the secondary measurement reference signal (i.e., a first cycle) may be longer than the transmission cycle of the primary measurement reference signal (i.e., a second cycle). Of course, in order to save system overhead and save resources, the base station may configure the secondary measurement reference signal transmitted on the other sub-bands to appear only in first n symbols of a resource unit of the UE being scheduled, such as an OFDM (Orthogonal Frequency Division Multiplexing) symbol, or when a length of the resource unit being scheduled is long, the secondary measurement reference signal may appear in the first n symbols according to a preset cycle.

In step S205: determining whether or not the secondary measurement reference signal transmitted on the other sub-bands is associated with the primary measurement reference signal transmitted on the basic sub-band; and if yes, implementing step S206, otherwise, implementing step S207.

In some embodiments, when the other sub-bands are configured with the secondary measurement reference signal, the base station may inform, via a signaling transmitted on the basic sub-band, the UE whether or not the primary measurement reference signal on the basic sub-band and the secondary measurement reference signal are associated. For example, in one embodiment of the present disclosure, when the base station sets reference signal association information carried in a signaling transmitted on the basic sub-band to a preset first value, it indicates that the primary measurement reference signal and the secondary measurement reference signal are associated with each other, that is, the primary measurement reference signal and the secondary measurement reference signal quasi share a common site address; on the other hand, when the base station sets a value of reference signal association information carried in a signaling transmitted on the basic sub-band to a preset second value, it indicates the primary measurement reference signal and the secondary measurement reference signal are not associated with each other, that is, the primary measurement reference signal and the secondary measurement reference signal do not quasi share a common site address.

In step S206: keeping the UE in time and frequency synchronization with the base station on the other sub-bands, based on a measurement result obtained by measuring the secondary measurement reference signal and the measurement result obtained by measuring the primary measurement reference signal.

In some embodiments, when the UE determines that the secondary measurement reference signal transmitted on the other sub-bands is associated with the primary measurement reference signal transmitted on the basic sub-band, such as the primary measurement reference signal and the secondary measurement reference signal quasi share a common site address, the UE calculates a first time deviation and a first frequency deviation based on the primary measurement reference signal, and calculates a second time deviation and a second frequency deviation based on the secondary measurement reference signal. Thereafter, a united process is implemented to the first time deviation and the second time deviation, and to the first frequency deviation and the second frequency deviation, to obtain a third time deviation and a third frequency deviation. Then, the UE can calibrate a time and a frequency of its own receiver based on the third time deviation and the third frequency deviation, so as to synchronize with the base station in time and frequency on the other sub-bands.

Of course, the base station may transmit the reference signal association information to the UE via a LTE (Long Term Evolution) carrier, which the present disclosure gives no limitation.

In step S207: keeping the UE in time and frequency synchronization with the base station, based on a measurement result obtained by measuring the secondary measurement reference signal transmitted on the other sub-bands.

In some embodiments, when the UE determines, via the signaling transmitted on the basic sub-band or the LTE carrier, that the secondary measurement reference signal transmitted on the other sub-bands and the primary measurement reference signal transmitted on the basic sub-band are not associated with each other, such as the primary measurement reference signal and the secondary measurement reference signal do not quasi share a common site address, the UE can achieve time and frequency synchronization with the base station on the other sub-bands, only based on the secondary measurement reference signal transmitted on the other sub-bands.

Specifically, when the UE determines, via the signaling transmitted on the basic sub-band or the LTE carrier, that the other sub-bands are configured with the secondary measurement reference signal and the preset reference signal association information is the preset second value, in this case, the secondary measurement reference signal transmitted on the other sub-bands will be measured; a fifth time deviation and a fifth frequency deviation between the UE and the base station on the other sub-bands will be calculated based on the measurement result obtained by measuring the second measurement reference signal; and the UE is kept in time and frequency synchronization with the base station on the other sub-bands, based on the fifth time deviation and the fifth frequency deviation obtained.

In some embodiments, the method for time and frequency synchronization of the present disclosure may further include flowing steps.

In step S208: measuring a UE-specific reference signal transmitted on the other sub-bands, and keeping the UE in time and frequency synchronization with the base station on the other sub-bands, based on a measurement result obtained by measuring the UE-specific reference signal.

In some embodiments, when the UE is scheduled to receive data on other sub-bands, the base station can configure a corresponding UE-specific reference signal for the other sub-bands according to practical needs, so that the UE can demodulate data transmitted by the base station on the other sub-bands based on the UE-specific reference signal transmitted on the other sub-bands.

At the same time, the UE can also track the UE-specific reference signal transmitted on the other sub-bands, so as to calculate a time and a frequency corresponding to the UE-specific reference signal, and further perform a calibration to a current time and a current frequency of its own receiver. That is to say, the time and frequency deviations between the UE and the base station on the other sub-bands are calibrated based on a fourth time deviation and a fourth frequency deviation calculated based on the UE-specific reference signal.

Specifically, there are following three situations.

(1) When the UE is kept in time and frequency synchronization with the based station on the basic sub-band by only using the primary measurement reference signal transmitted on the basic sub-band configured in the base station, by comparing a second time deviation calculated based on the UE-specific reference signal transmitted on the other sub-bands configured in the base station to a first time deviation, a corresponding first time deviation calibration result can be obtained; and by comparing a second frequency deviation calculated based on the UE-specific reference signal to a first frequency deviation, a corresponding first frequency deviation calibration result can be obtained, so that time and frequency synchronization between the UE and the base station on the other sub-bands can be achieved based on the first time deviation calibration result and the first frequency deviation calibration result.

(2) When the UE is kept in time and frequency synchronization with the based station on the basic sub-band by using the primary measurement reference signal transmitted on the basic sub-band configured in the base station and the secondary measurement reference signal transmitted on the other sub-bands configured in the base station, the UE can calculate a fourth time deviation and a fourth frequency deviation between the UE and the base station on the basic sub-band based on a measurement result obtained by measuring the UE-specific reference signal, calibrate the third time deviation based on the fourth time deviation to obtain a corresponding second time deviation calibration result, and calibrate the third frequency deviation based on the fourth frequency deviation to obtain a corresponding second frequency deviation calibration result, so that time and frequency synchronization between the UE and the base station on the other sub-bands can be achieved based on the second time deviation calibration result and the second frequency deviation calibration result.

(3) When the UE is kept in time and frequency synchronization with the based station on the other sub-bands by only using the secondary measurement reference signal transmitted on the other sub-bands configured in the base station, the UE can calculate a sixth time deviation and a six frequency deviation between the UE and the base station on the basic sub-band, based on a measurement result obtained by measuring the UE-specific reference signal; the fifth time deviation can be calibrated based on the sixth time deviation to obtain a corresponding third time deviation calibration result; the fifth frequency deviation can be calibrated based on the sixth frequency deviation to obtain a corresponding third frequency deviation calibration result, so that time and frequency synchronization between the UE and the base station on the other sub-bands can be achieved based on the third time deviation calibration result and the third frequency deviation calibration result.

The method of the present disclosure is described as above, and a device corresponding to the method will be described in detail as following.

Figure 3:
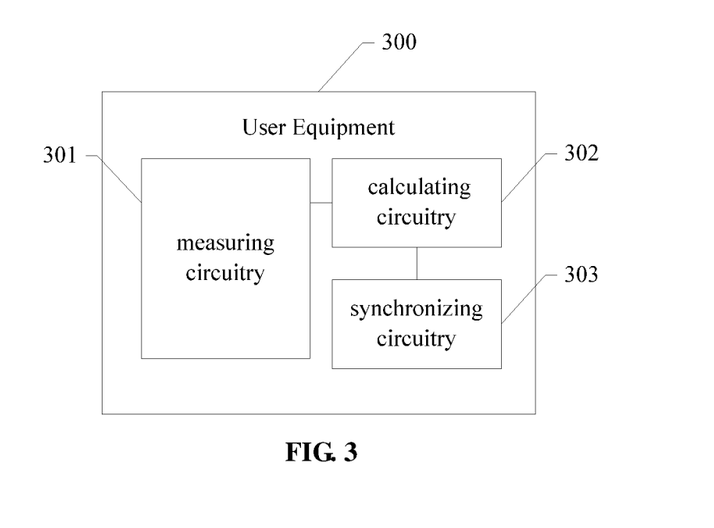
FIG. 3 schematically illustrates a structure of a user equipment according to one embodiment of the present disclosure.

FIG. 3 schematically illustrates a structure of a UE (User Equipment) according to one embodiment of the present disclosure. Referring to FIG. 3, in some embodiments, the UE 300 provided by the present disclosure may include a measuring circuitry 301, a calculating circuitry 302 and a synchronizing circuitry 303.

The measuring circuitry 301 is configured to: measure a primary measurement reference signal transmitted on at least one basic sub-band, wherein the at least one basic sub-band has a preset carrier numerology and a preset waveform configuration.

The calculating circuitry 302 is configured to: calculate a first time deviation and a first frequency deviation between the UE and a base station on the at least one basic sub-band, based on a measurement result obtained by measuring the primary measurement reference signal.

The synchronizing circuitry 303 is configured to: keep the UE in time and frequency synchronization with the base station on the at least one basic sub-band, based on the first time deviation and the first frequency deviation.

In some embodiments, the primary measurement reference signal transmitted on the basic sub-band is configured and transmitted by the base station.

In some embodiments, the measuring circuitry 301 is further configured to: when the UE is scheduled to receive data on other sub-bands, measure a UE-specific reference signal transmitted on the other sub-bands.

The calculating circuitry 302 is further configured to: calculate a second time deviation and a second frequency deviation between the UE and the base station on the at least one basic sub-band, based on a measurement result obtained by measuring the UE-specific reference signal; and calibrate the first time deviation based on the second time deviation to obtain a corresponding first time deviation calibration result, and calibrate the first frequency deviation based on the second frequency deviation to obtain a corresponding first frequency deviation calibration result.

The synchronizing circuitry 303 is further configured to: keep the UE in time and frequency synchronization with the base station on the other sub-bands, based on the first time deviation calibration result and the first frequency deviation calibration result.

In some embodiments, the UE-specific reference signal transmitted on the other sub-bands is configured and transmitted by the base station.

In some embodiments, the measuring circuitry 301 is further configured to: when the UE is scheduled to receive data on other sub-bands, and the UE determines that the other sub-bands are configured with a secondary measurement reference signal and the secondary measurement reference signal is associated with the primary measurement reference signal, measure the secondary measurement reference signal transmitted on the other sub-bands.

The calculating circuitry 302 is further configured to: calculate a third time deviation and a third frequency deviation between the UE and the base station on the other sub-bands, based on the measurement result obtained by measuring the primary measurement reference signal and a measurement result obtained by measuring the secondary measurement reference signal.

The synchronizing circuitry 303 is further configured to: keep the UE in time and frequency synchronization with the base station on the other sub-bands, based on the third time deviation and the third frequency deviation.

In some embodiments, the secondary measurement reference signal transmitted on the other sub-bands is configured and transmitted by the base station.

In some embodiments, the measuring circuitry 301 is further configured to: when reference signal association information transmitted by the base station is determined to be a preset first value, determine that the secondary measurement reference signal is associated with the primary measurement reference signal.

In some embodiments, the measuring circuitry 301 is further configured to: when the UE is scheduled to receive data on the other sub-bands, measure the UE-specific reference signal transmitted on the other sub-bands.

The calculating circuitry 302 is further configured to: calculate a fourth time deviation and a fourth frequency deviation between the UE and the base station on the other sub-bands, based on a measurement result obtained by measuring the UE-specific reference signal; calibrate the third time deviation based on the fourth time deviation to obtain a second time deviation calibration result, and calibrate the third frequency deviation based on the fourth frequency deviation to obtain a second frequency deviation calibration result.

The synchronizing circuitry 303 is further configured to: keep the UE in time and frequency synchronization with the base station on the other sub-bands, based on the second time deviation calibration result and the second frequency deviation calibration result.

In some embodiments, the UE-specific reference signal transmitted on the other sub-bands is configured and transmitted by the base station.

In some embodiments, the measuring circuitry 301 is further configured to: when the UE is scheduled to receive data on other sub-bands, and the UE determines that the other sub-bands are configured with a secondary measurement reference signal and the secondary measurement reference signal is not associated with the primary measurement reference signal, measure the secondary measurement reference signal transmitted on the other sub-bands.

The calculating circuitry 302 is further configured to: calculate a fifth time deviation and a fifth frequency deviation between the UE and the base station on the other sub-bands, based on a measurement result obtained by measuring the secondary measurement reference signal.

The synchronizing circuitry 303 is further configured to: keep the UE in time and frequency synchronization with the base station on the other sub-bands, based on the fifth time deviation and the fifth frequency deviation.

In some embodiments, the secondary measurement reference signal transmitted on the other sub-bands is configured and transmitted by the base station.

In some embodiments, the measuring circuitry 301 is further configured to: when reference signal association information transmitted by the base station is determined to be a present second value, determine that the secondary measurement reference signal is not associated with the primary measurement reference signal.

In some embodiments, the measuring circuitry 301 is further configured to: when the UE is scheduled to receive data on the other sub-bands, measure the UE-specific reference signal transmitted on the other sub-bands.

The calculating circuitry 302 is further configured to: calculate a sixth time deviation and a sixth frequency deviation between the UE and the base station on the other sub-bands, based on a measurement result obtained by measuring the UE-specific reference signal; calibrate the fifth time deviation based on the sixth time deviation to obtain a corresponding third time deviation calibration result, and calibrate the fifth frequency deviation based on the sixth frequency deviation to obtain a corresponding third frequency deviation calibration result.

The synchronizing circuitry 303 is further configured to: keep the UE in time and frequency synchronization with the base station on the other sub-bands, based on the third time deviation calibration result and the third frequency deviation calibration result.

In some embodiments, the secondary measurement signal transmitted on the other sub-bands is configured and transmitted by the base station.

In some embodiments, the primary measurement reference signal is transmitted according to a first cycle, and the secondary measurement reference signal is transmitted according to a second cycle.

In some embodiments, the primary measurement reference signal is transmitted according to a first cycle, and the secondary measurement reference signal is not transmitted periodically.

In some embodiments, the UE-specific reference signal is further used by the UE to demodulate data received on the other sub-bands.

Those skilled in the art can understand that, all steps or some of the steps in various methods of above recited embodiments of the present disclosure can be accomplished by hardware under instruction of programs. The programs can be stored in a readable storage medium of a computer, wherein the storage medium may include: ROM (Read Only Memory), RAM (Random Access Memory), magnetic disk, light disk, etc.

Although the present disclosure has been disclosed above with reference to preferred embodiments thereof, it should be understood by those skilled in the art that various changes and modifications may be made without departing from the spirit or scope of the disclosure. Accordingly, the present disclosure covers changes and modifications made to the present disclosure that fall into scopes defined by the claims and equivalent technical solutions thereof.

The invention claimed is:

1. A method for time and frequency synchronization, comprising:
   a UE (User Equipment) measuring a primary measurement reference signal transmitted on at least one basic sub-band, where the at least one basic sub-band has a preset carrier numerology and a preset waveform configuration;
   calculating a first time deviation and a first frequency deviation between the UE and a base station on the at least one basic sub-band, based on a measurement result obtained by measuring the primary measurement reference signal; and keeping the UE in time and frequency synchronization with the base station on the at least one basic sub-band, based on the first time deviation and the first frequency deviation, wherein when the UE is scheduled to receive data on another sub-band other than the at least one basic sub-band, the method further comprises:

when the another sub-band is determined to be configured with a secondary measurement reference signal and the secondary measurement reference signal is determined to be not associated with the primary measurement reference signal, measuring the secondary measurement reference signal transmitted on the another sub-band;

calculating a second time deviation and a second frequency deviation between the UE and the base station on the another sub-band, based on a measurement result obtained by measuring the secondary measurement reference signal; and keeping the UE in time and frequency synchronization with the base station on the another sub-band, further based on the second time deviation and the second frequency deviation.

2. The method for time and frequency synchronization according to claim 1, wherein the primary measurement reference signal transmitted on the at least one basic sub-band is configured and transmitted by the base station.

3. The method for time and frequency synchronization according to claim 1, wherein when the UE is scheduled to receive data on the another sub-band other than the at least one basic sub-band, and the another sub-band is not configured with a secondary measurement reference signal, the method further comprises:

measuring a UE-specific reference signal transmitted on the another sub-band;

calculating a third time deviation and a third frequency deviation between the UE and the base station on the another sub-band, based on a measurement result obtained by measuring the UE-specific reference signal;

calibrating the first time deviation based on the third time deviation to obtain a first time deviation calibration result, and calibrating the first frequency deviation based on the third frequency deviation to obtain a first frequency deviation calibration result; and keeping the UE in time and frequency synchronization with the base station on the another sub-band, based on the first time deviation calibration result and the first frequency deviation calibration result.

4. The method far time and frequency synchronization according to claim 3, wherein the UE-specific reference signal transmitted on the another sub-band is configured and transmitted by the base station.

5. The method for time and frequency synchronization according to claim 3, wherein the UE-specific reference signal is further used for the UE demodulating the data received on the another sub-band.

6. The method for time and frequency synchronization according to claim 1, wherein when the UE is scheduled to receive data on the another sub-band other than the at least one basic sub-band, the method further comprises:

when the another sub-band is determined to be configured with the secondary measurement reference signal and the secondary measurement reference signal is determined to be associated with the primary measurement reference signal, measuring the secondary measurement reference signal transmitted on the another sub-band;

calculating a fourth time deviation and a fourth frequency deviation between the UE and the base station on the another sub-band, based on the measurement result obtained by measuring the primary measurement reference signal and a measurement result obtained by measuring the secondary measurement reference signal; and keeping the UE in time and frequency synchronization with the base station on the another sub-band, based on the fourth time deviation and the fourth frequency deviation.

7. The method for time and frequency synchronization according to claim 6, wherein the secondary measurement reference signal transmitted on the another sub-band is configured and transmitted by the base station.

8. The method for time and frequency synchronization according to claim 6, wherein the secondary measurement reference signal being determined to be associated with the primary measurement reference signal comprises: when reference signal association information transmitted by the base station is a preset first value, the secondary measurement reference signal being determined to be associated with the primary measurement reference signal.

9. The method for time and frequency synchronization according to claim 6, wherein the method further comprises:

measuring a UE-specific reference signal transmitted on the another sub-band;

calculating a fifth time deviation and a fifth frequency deviation between the UE and the base station on the another sub-band, based on a measurement result obtained by measuring the UE-specific reference signal;

calibrating the fourth time deviation based on the fifth time deviation to obtain a second time deviation calibration result, and calibrating the fourth frequency deviation based on the fifth frequency deviation to obtain a second frequency deviation calibration result; and keeping the UE in time and frequency synchronization with the base station on the another sub-band, based on the second time deviation calibration result and the second frequency deviation calibration result.

10. The method for time and frequency synchronization according to claim 9, wherein the UE-specific reference signal transmitted on the another sub-band is configured and transmitted by the base station.

11. The method for time and frequency synchronization according to claim 6, wherein the primary measurement reference signal is transmitted according to a first cycle, and the secondary measurement reference signal is transmitted according to a second cycle.

12. The method for time and frequency synchronization according to claim 6, wherein the primary measurement reference signal is transmitted according to a first cycle, and the secondary measurement reference signal is not transmitted periodically.

13. The method for time and frequency synchronization according to claim 1, wherein the secondary measurement reference signal transmitted on the another sub-band is configured and transmitted by the base station.

14. The method for time and frequency synchronization according to claim 1, wherein the secondary measurement reference signal being determined to be not associated with the primary measurement reference signal comprises: when reference signal association information transmitted by the base station is a preset second value, the secondary measurement reference signal being determined to be not associated with the primary measurement reference signal.

15. The method for time and frequency synchronization according to claim 1, comprising:
measuring a UE-specific reference signal transmitted on the another sub-band;
calculating a sixth time deviation and a sixth frequency deviation between the UE and the base station on the another sub-band, based on a measurement result obtained by measuring the UE-specific reference signal;
calibrating the second time deviation based on the sixth time deviation to obtain a third time deviation calibration result, and calibrating the second frequency deviation based on the sixth frequency deviation to obtain a third frequency deviation calibration result; and
keeping the UE in time and frequency synchronization with the base station on the another sub-band, based on the third time deviation calibration result and the third frequency deviation calibration result.

16. The method for time and frequency synchronization according to claim 15, wherein the LIE-specific reference signal transmitted on the another sub-band is configured and transmitted by the base station.

17. A UE (User Equipment), comprising:
a measuring circuitry configured to:
measure a primary measurement reference signal transmitted on at least one basic sub-band, wherein the at least one basic sub-band has a preset carrier numerology and a preset waveform configuration;
a calculating circuitry configured to:
calculate a first time deviation and a first frequency deviation between the UE and a base station on the at least one basic sub-band, based on a measurement result obtained by measuring the primary measurement reference signal; and
a synchronizing circuitry configured to:
keep the UE in time and frequency synchronization with the base station on the at least one basic sub-band, based on the first time deviation and the first frequency deviations,
wherein the measuring circuitry is further configured to:
when the UE is scheduled to receive data on another sub-band other than the at least one basic sub-band, the another sub-band is determined to be configured with a secondary measurement reference signal, and the secondary measurement reference signal is determined to be not associated with the primary measurement reference signal, measure the secondary measurement reference signal transmitted on the another sub-band;
the calculating circuitry is further configured to: calculate a second time deviation and a second frequency deviation between the UE and the base station on the another sub-band, based on a measurement result obtained by measuring the secondary measurement reference signal; and
the synchronizing circuitry is further configured to: keep the UE in time and frequency synchronization with the base station on the another sub-band, based on the second time deviation and the second frequency deviation.

18. The UE according to claim 17, wherein the primary measurement reference signal transmitted on the at least one basic sub-band is configured and transmitted by the base station.

19. The UE according to claim 17, wherein: the measuring circuitry is further configured to: when the UE is scheduled to receive data on the another sub-band other than the at least one basic sub-band, and the another sub-band is not configured with the secondary measurement reference signal, measure a UE-specific reference signal transmitted on the another sub-band;
the calculating circuitry is further configured to: calculate a third time deviation and a third frequency deviation between the UE and the base station on the another sub-band, based on a measurement result obtained by measuring the UE-specific reference signal, calibrate the first time deviation based on the third time deviation to obtain a first time deviation calibration result, and calibrate the first frequency deviation based on the third frequency deviation to obtain a first frequency deviation calibration result; and
the synchronizing circuitry is further configured to: keep the UE in time and frequency synchronization with the base station on the another sub-band, based on the first time deviation calibration result and the first frequency deviation calibration result.

20. The UE according to claim 19, wherein the UE-specific reference signal transmitted on the another sub-band is configured and transmitted by the base station.

21. The UE according to claim 19, wherein the UE-specific reference signal is further used for the UE demodulating the data received on the another sub-band.

22. The UE according to claim 17, wherein:
the measuring circuitry is further configured to: when the UE is scheduled to receive data on the another sub-band other than the at least one basic sub-band, the another sub-band is determined to be configured with the secondary measurement reference signal, and the secondary measurement reference signal is determined to be associated with the primary measurement reference signal, measure the secondary measurement reference signal transmitted on the another sub-band;
the calculating circuitry is further configured to: calculate a fourth time deviation and a fourth frequency deviation between the UE and the base station on the another sub-band, based on the measurement result obtained by measuring the primary measurement reference signal and a measurement result obtained by measuring the secondary measurement reference signal; and
the synchronizing circuitry is further configured to: keep the UE in time and frequency synchronization with the base station on the another sub-band, based on the fourth time deviation and the fourth frequency deviation.

23. The UE according to claim 22, wherein the secondary measurement reference signal transmitted on the another sub-band is configured and transmitted by the base station.

24. The UE according to claim 22, wherein the measuring circuitry is further configured to: when reference signal association information transmitted by the base station is a preset first value, determine the secondary measurement reference signal to be associated with the primary measurement reference signal.

25. The UE according to claim 22, wherein: the measuring circuitry is further configured to: measure a UE-specific reference signal transmitted on the another sub-band;
the calculating circuitry is further configured to: calculate a fifth time deviation and a fifth frequency deviation between the UE and the base station on the another sub-band, based on a measurement result obtained by measuring the UE-specific reference signal, calibrate the third time deviation based on the fifth time deviation to obtain a second time deviation calibration result, and calibrate the third frequency deviation based on the fifth frequency deviation to obtain a second frequency deviation calibration result; and the synchronizing circuitry is further configured to: keep the UE in time and frequency synchronization with the base station on the another sub-band, based on the second time deviation calibration result and the second frequency deviation calibration result.

26. The UE according to claim 25, wherein the UE-specific reference signal transmitted on the another sub-band is configured and transmitted by the base station.

27. The UE according to claim 22, wherein the primary measurement reference signal is transmitted according to a first cycle, and the secondary measurement reference signal is transmitted according to a second cycle.

28. The UE according to claim 22, wherein the primary measurement reference signal is transmitted according to a first cycle, and the secondary measurement reference signal is not transmitted periodically.

29. The UE according to claim 17, wherein the secondary measurement reference signal transmitted on the another sub-band is configured and transmitted by the base station.

30. The UE according to claim 17, wherein the measuring circuitry is further configured to: when reference signal association information transmitted by the base station is a preset second value, determine the secondary measurement reference signal to be not associated with the primary measurement reference signal.

31. The UE according to claim 17, wherein:

the measuring circuitry is further configured to measure a UE-specific reference signal transmitted on the another sub-band;

the calculating circuitry is further configured to: calculate a sixth time deviation and a sixth frequency deviation between the UE and the base station on the another sub-band, based on a measurement result obtained by measuring the UE-specific reference signal, calibrate the second time deviation based on the sixth time deviation to obtain a third time deviation calibration result, and calibrate the second frequency deviation based on the sixth frequency deviation to obtain a third frequency deviation calibration result; and the synchronizing circuitry is further configured to: keep the UE in time and frequency synchronization with the base station on the another sub-band, based on the third time deviation calibration result and the third frequency deviation calibration result.

32. The UE according to claim 30, wherein the UE-specific reference signal transmitted on the another sub-band is configured and transmitted by the base station.

* * * * *

UNITED STATES PATENT AND TRADEMARK OFFICE
CERTIFICATE OF CORRECTION

PATENT NO.         : 10,251,142 B2
APPLICATION NO.    : 15/453260
DATED              : April 2, 2019
INVENTOR(S)        : Zhou et al.

Page 1 of 1

It is certified that error appears in the above-identified patent and that said Letters Patent is hereby corrected as shown below:

In the Claims

Column 20 Line 23, Claim 32 should depend on Claim 31 and not Claim 30.

Signed and Sealed this
Twenty-seventh Day of August, 2019

Andrei Iancu
*Director of the United States Patent and Trademark Office*